March 11, 1952     A. G. LUNDGREN     2,588,738
TOOL FOR SECURING CABLE CLAMPS
Filed Aug. 1, 1949
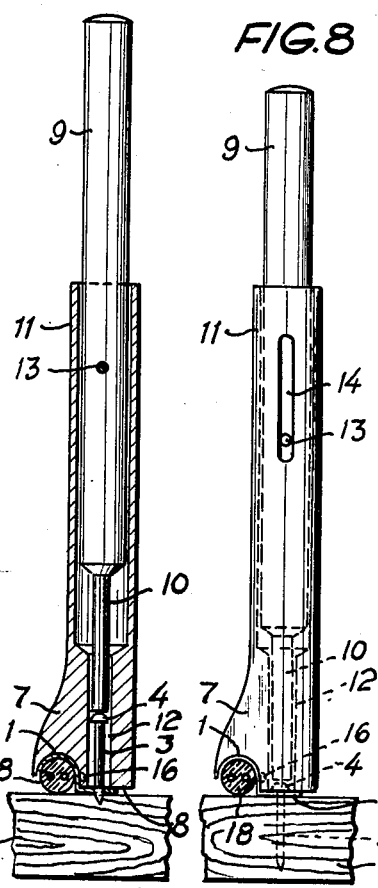
INVENTOR.
Axel G. Lundgren
BY
Cushman, Darby & Cushman
ATTORNEYS Patented Mar. 11, 1952

2,588,738

UNITED STATES PATENT OFFICE 2,588,738

TOOL FOR SECURING CABLE CLAMPS

Axel Gustav Lundgren, Vasteras, Sweden

Application August 1, 1949, Serial No. 107,848
In Sweden August 24, 1948

1 Claim. (Cl. 1—47)

This invention relates to a tool for securing a cable clamp to a structural member.

For carrying out the invention a combination of a cable clamp and a securing element for the clamp, as for instance a pin, a nail, screw or the like, provisionally attached to the clamp is employed with the tool.

Another object of the invention is to provide a tool particularly well suited for securing the clamp referred to.

The invention will be more fully described hereinafter in connection with the accompanying drawing and pointed out in the annexed claim.

Fig. 1 is a profile view of the clamp-securing element-combination according to the invention.

Fig. 2 is a short-side view of said combination.

Fig. 3 is a side view of a tool for securing the clamp.

Fig. 4 is a view from the lower end of said tool.

Fig. 5 is a section by the plane A—A in Fig. 3.

Fig. 6 is a side view of the tool at right angles to the view of Fig. 3.

Fig. 7 is a section showing a tool containing a clamp-securing element-combination according to Fig. 1 in an initial position for securing a cable, prior to driving in the securing element.

Fig. 8 is a view corresponding with Fig. 7 and shows the position after having completed the driving in of the securing element.

The clamp shown in Figures 1 and 2 consists of a U-shaped portion 1, a flat portion 2 being bent off at an approximately right angle from the longer shank of the U-shape. This clamp is made of one piece of pressed sheet material. A securing element, in the embodiment shown a pin 3 provided with a head 4 and a point 5, is inserted in an aperture in the flat portion 2 to such an extent, that merely the point 5 extends beyond the lower face of the flat portion 2. The aperture is dimensioned narrow with respect to the diameter of the pin, due to which the pin is jammed in the aperture and thus provisionally attached to the clamp. On the other hand, when using the clamp, the pin may rather readily be driven through the aperture by a blow or by suitable pressure means.

As a special feature of the invention a wart-like protuberance or bead 6 is provided on one side of the U-shaped portion. This protuberance 6 may be formed simultaneously in the pressing operation for producing the clamp. This protuberance 6 is intended to engage a corresponding recess in the tool for securing the clamp. By means of this provision the clamp is retained in the tool during the handling of the tool prior to its application to the definite place of securing the clamp, thus the handling of the tool being considerably facilitated.

The tool shown in Figures 3-6 for securing the clamp has its lower end provided with a neb-shaped projection 7 and a flat face 8, these two portions together forming a seating for receiving the clamp. A curved recess in the projection 7 is adapted to receive the U-shaped portion 1 of the clamp and the plane face 8 is adapted to abut against the flat portion 2 of the clamp. A plunger 9 is slidably guided in a sleeve-like member 11. The lower portion 10 of the plunger 9, i. e. the portion adjacent to the end acting on the securing element or pin 3 of the cable clamp, is guided in a reduced cylindrical hole or axial bore 12 which forms a "pin channel" serving as a guide for the securing element 3 when driving in same. This will be quite evident from Figures 7 and 8. Fig. 7 shows the tool in an axial section equipped with a clamp 1, 2 provided with a securing element 3 as shown in Figures 1 and 2, the whole being put in position against a support onto which a cable 18 is to be fixed. Fig. 8 shows, partially in section and partially in a lateral view, the position after the securing element has been completely driven in.

In order to prevent the plunger 9 from separating from the other part of the tool it may conveniently be provided with a pin 13 projecting in transverse direction and engaging an elongated aperture provided in the sleeve-like member 11, thus limiting the movement of the plunger in both directions.

In order to ensure, when the securing element 3 has been nearly entirely driven in, that the driving stroke or pressure may not be transmitted from the plunger by the tool and the neb-like projection 7 to the very cable which in such a case might get damaged, the plunger should be free at least to move down to have its end in plane with the lower face 8 of the tool or preferably to move down beyond the position occupied when the securing element has been entirely driven home. For that reason, preferably the limitation of the plunger 9 is arranged in such a manner that, in the lower extreme position of the plunger, the end of the plunger slightly projects from the face 8 as indicated at 15 in Figures 3 and 6.

A small recess 16 is provided at the place of the clamp-receiving seating of the tool. This recess 16 is adapted to be engaged by the aforementioned wart-like protuberance 6 of the clamp, thus permitting the clamp to be retained in the tool whilst positioning the tool at the securing place desired.

Alternatively or additionally the walls of the "pin channel" 12 may have a rough surface in order to retain the securing element 3, 4 and 5 thus to prevent the combination clamp-securing element from falling out of the tool.

By use of the clamp-securing element-combination according to the invention and particularly by said use with the aid of the tool described the possibility of damaging the cable or the like is almost entirely eliminated. Since the securing element initially only by a very small portion (e. g. merely the very point 5) projects below the lower surface of the flat portion 2 of the clamp, the clamp can at the beginning of the securing operation be applied with great accuracy at the place desired. As a securing element a thin pin or a very slender nail may be employed which may readily be driven in and which causes the least possible damage to the wall, roof or other support.

What I claim is:

A tool for securing a clamp to the work, said clamp having a laterally extending apertured end portion and a curved portion provided with an outwardly projecting bead, a securing pin projecting into the aperture of the end portion so as to be provisionally maintained in an upright position, said tool including a sleeve having a reduced bore portion extending to the lower end thereof and into which said pin extends, a plunger axially slidable in said sleeve and having a reduced end portion for engaging said pin, the lower end of said tool having a flat face adjacent the reduced bore portion and having a laterally offset portion provided with a recess arranged to receive the curved portion of said clamp, the laterally extending portion of the clamp being positioned below said flat face when the parts are assembled, and the wall of said recess having a notch for detachably receiving said bead to temporarily retain the clamp on the tool prior to positioning the clamp on the work.

AXEL GUSTAV LUNDGREN.

REFERENCES CITED

The following references are of record in the file of this patent:

UNITED STATES PATENTS

| Number | Name | Date |
|---|---|---|
| 647,169 | Vogel | Apr. 10, 1900 |
| 1,365,629 | Lieb | Jan. 11, 1921 |

FOREIGN PATENTS

| Number | Country | Date |
|---|---|---|
| 93,771 | Sweden | Oct. 16, 1937 |
| 103,811 | Sweden | Aug. 3, 1940 |
| 128,530 | Switzerland | Nov. 1, 1928 |
| 682,904 | Germany | Oct. 26, 1939 |